Dec. 21, 1926.
J. H. LONSDALE
1,611,467
FLEXIBLE COUPLING
Filed Sept. 25, 1925    2 Sheets-Sheet 2
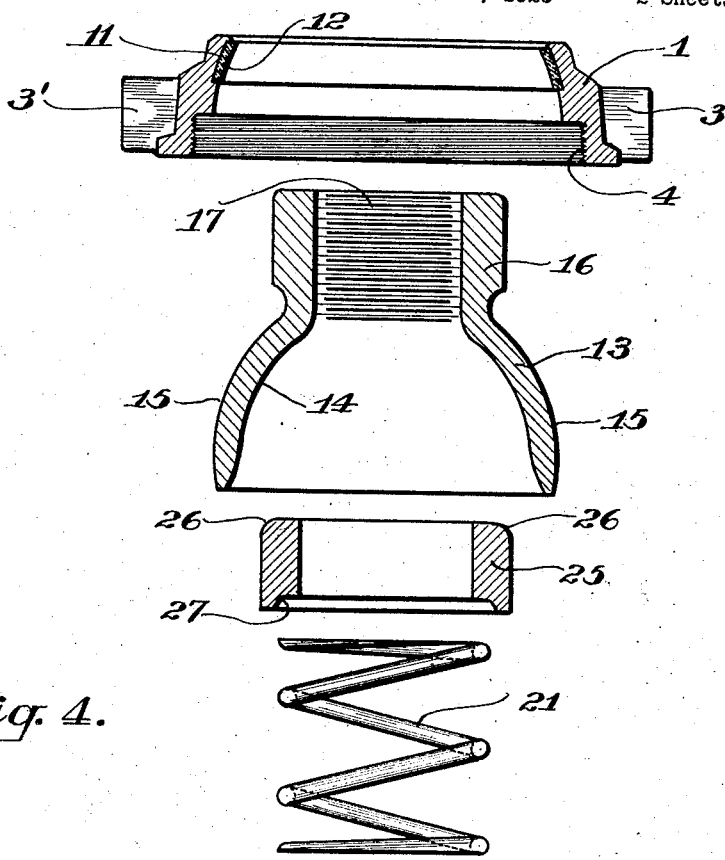
Fig. 4.
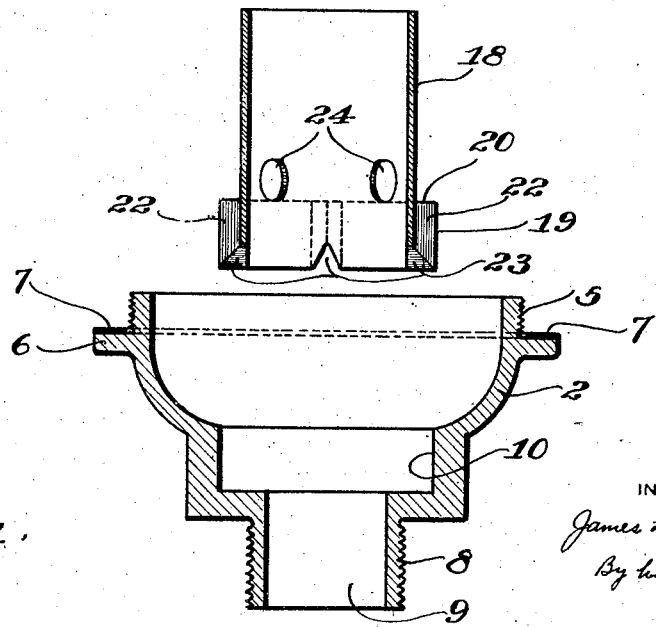
WITNESSES
INVENTOR
James H. Lonsdale Patented Dec. 21, 1926.

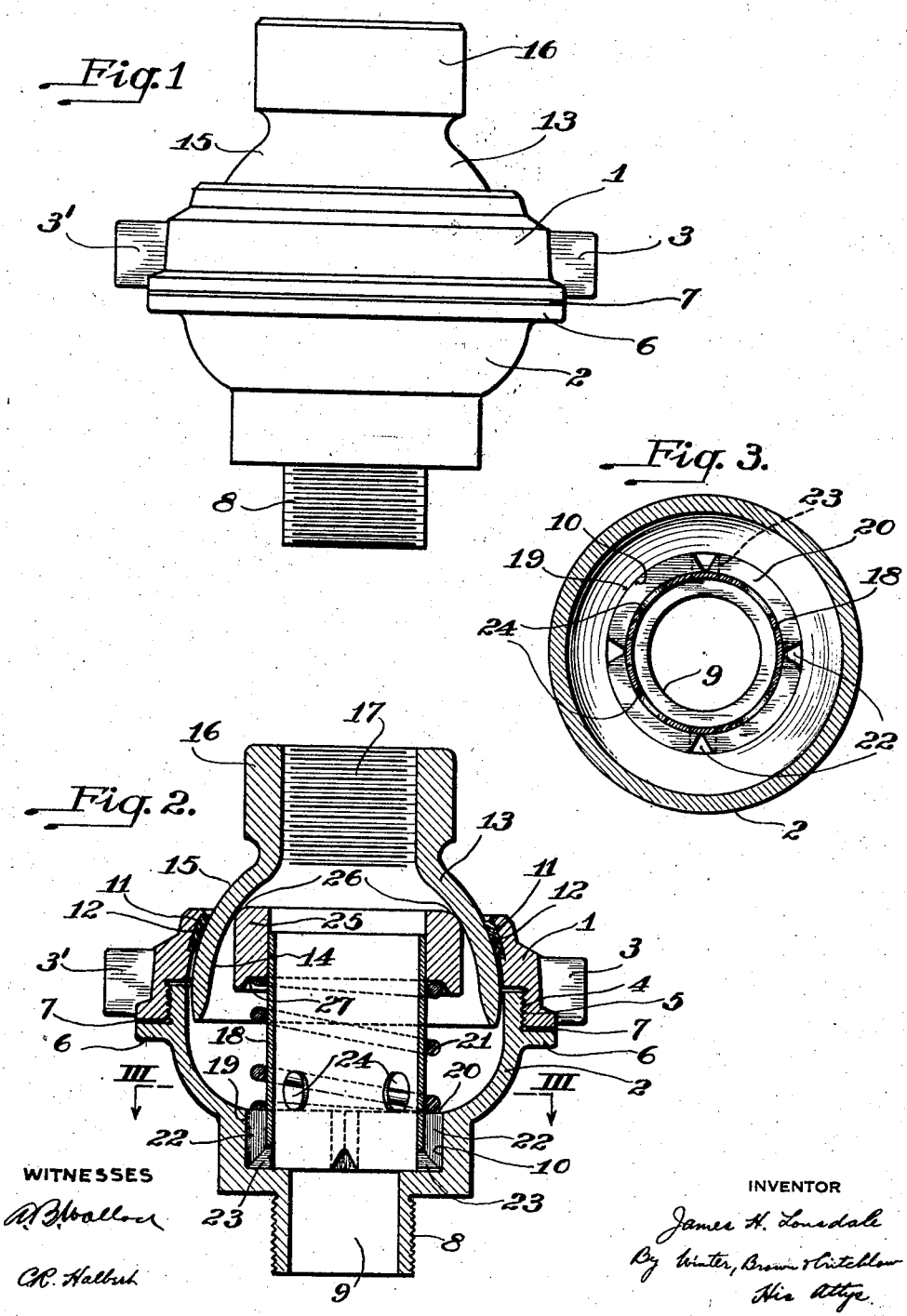

1,611,467

UNITED STATES PATENT OFFICE.

JAMES H. LONSDALE, OF PITTSBURGH, PENNSYLVANIA.

FLEXIBLE COUPLING.

Application filed September 25, 1925. Serial No. 58,534.

This invention relates to couplings, and particularly to a flexible coupling, or one of the so-called Universal type, especially adapted for use in connection with gasoline dispensing apparatus, or under conditions generally requiring an extremely flexible but leak-proof joint.

Heretofore, considerable difficulty has been experienced from leakage with flexible couplings on conduits for conveying gasoline due to the well known proclivity of such liquid to find its way past contacting surfaces apparently maintained in sealed abutting relation, as well as frequent sticking of the parts due partly to corrosion and partly to the deposit of foreign matter thereupon, thus rendering it necessary to apply excessive force to secure swivelling of the joint. It is an object of this invention to overcome these difficulties by providing a flexible coupling which will not only effectively prevent objectionable leakage past the several sealing surfaces, but which will permit readjustment in the positions of the relatively movable parts upon application of a comparatively small amount of force.

Other objects of the invention are to provide a flexible coupling of the character referred to in which the parts may be easily assembled and disassembled thus aiding in the ready removal of corrosion and foreign material accumulating upon the several parts, and within the passages of the coupling, one in which special drainage grooves are formed by cooperation of the tubular spring guide and main shell of the casing to assure complete drainage of all gasoline admitted to the coupling towards the discharge outlet thereof, in which the removable spring guide tube is rigidly supported and constantly urged to its seat within the shell, in which the guide tube functions to properly position the internal sealing ring, in which the single spring employed performs the dual function of seating the guide tube and maintaining a sealing contact between the sealing ring and ball member as well as between the ball member and the shell, in which a sealed joint is provided upon both the interior and exterior of the ball member, and one which can be readily fabricated at a comparatively low cost.

These and other objects of the invention will more fully appear when taken in conjunction with the following description and the appended claims.

In the accompanying drawings, Fig. 1 is a side elevation showing the complete coupling in assembled relation; Fig. 2 a vertical sectional view taken through the assembled coupling; Fig. 3 a horizontal transverse sectional view taken substantially on the line III—III of Fig. 2; and Fig. 4 a view, partly in section and partly in elevation, showing the several parts of the complete coupling separated from each other and disposed in alignment whereby to depict not only the detailed structure of the several parts, but the ease with which they can be assembled and disassembled.

Referring to the drawings, the split shell or casing, as clearly shown in Fig. 1, is made up of two parts, one of which is designated by the reference numeral 1, and the remaining portion at 2. The part 1 is in the form of an annulus equipped upon its outer periphery with the radially projecting lugs 3, 3', adapted to be engaged by a spanner or other similar tool in assembling the parts, and equipped upon its interior with the internal threads 4. The threaded portion 4 coacts with an externally threaded portion 5 provided upon the part 2 beyond its radially extending peripheral flange 6. When the two parts of the split shell are assembled, as shown in Figs. 1 and 2, a suitable gasket 7 is ordinarily interposed between the parts of the shell.

The part 2 is substantially semi-spherical in shape and has a depending exteriorly threaded nipple 8 depending therefrom, the bore 9 of which provides a discharge opening for the coupling, and immediately surrounding the discharge opening upon the interior of the shell is a receiving recess 10. The part 1 is provided upon its interior, and at a point adjacent its upper edge, with an annular groove 11 for the reception of a suitable gasket 12 which projects radially inwards beyond the body of the part 1, all as clearly shown in Figs. 2 and 4.

Swivelly mounted within the split shell is a ball member 13, semi-spherical in shape, and provided with concentric internal and external sealing surfaces 14 and 15, respectively, the external sealing surface of the ball member coacting with the gasket 12 to form a sealed or leak-proof joint in a manner which will more fully appear as the description proceeds. The ball member 13 has an upwardly extending shank 16 provided with an internally threaded bore serving as an inlet opening 17 for the coupling.

A tubular guide is indicated at 18 which is equipped with an enlarged terminal 19 adjacent its lower end, the upper edge of which forms a shoulder 20 serving as an abutment upon which is adapted to rest the lower end of a coiled compression spring 21 neatly encircling the exterior of the guide tube. The enlarged terminal 19 neatly seats within the receiving recess 10, in the manner clearly shown in Fig. 2, and is provided at spaced points circumferentially thereof with a plurality of drainage grooves 22 extending longitudinally of the tube. The lower extremities of the grooves 22 open into transversely extending notches or grooves 23 communicating with the interior of the shell. The guide tube 18 is also provided with a series of spaced apertures 24 extending through the wall thereof, and disposed at a point intersecting and immediately above the line of juncture of the enlarged terminal 19 and the interior of the part 2 of the shell. In other words, the lower portions of the apertures 24 are coincident with the plane defined by the shoulder 20.

Telescopically engaging the upper portion of the guide tube 18 and neatly fitting thereupon but capable of free sliding movement is an annular sealing ring 25 having its upper outer edge rounded as indicated at 26 so as to provide a smooth but effective sealed joint with the internal surface of the ball member, and having its bottom edge cut away in the manner clearly indicated at 27 whereby to form a retaining seat for the upper end of the coiled compression spring 21. It is noted that the depressed seat 27 coacts with the spring 21 in such manner that the sealing ring 25 is readily positioned concentrically of the guiding tube 18 when the upper end of the spring 21 projects slightly above the guide tube 18, thus facilitating the easy assembly of the ring upon the tube upon compression of the spring so as to bring the sealing ring into the relative position indicated in Fig. 2 of the drawings, also that the width of the abutment afforded by the shoulder 20 is of sufficient width to form the entire seating surface provided for the spring 21.

In assembling the several parts, particular attention being directed to Fig. 4 of the drawings, the enlarged terminal 19 is first seated within the receiving recess 10 of the part 2 of the shell. The coiled compression spring 21 is then placed around the tube 18 with its lower end seated upon the shoulder 20, it being understood that at this stage the upper end of the spring projects slightly above the top margin of the tube. The sealing ring 25 is next placed upon the spring with the ball member 13 thereupon, and with the part 1 of the shell encircling the ball member. Pressure is then exerted downwardly upon the several parts 1, 13 and 25, until the threaded portions 4 and 5 of the shell can be engaged. Due partly to the fact that the spring 21 neatly encircles the tube 18, and partly to the coaction of the cutaway seat 27 of the sealing ring 25 which properly positions the sealing ring concentrically of the guide tube, this method of assembly may be readily accomplished without difficulty. After assembly in this manner, in which the several parts assume the relative positions shown in Fig. 2, the spring 21 is sufficiently compressed to permit the sealing ring 25 to telescopically engage the upper end of the guide tube. As previously explained, the threaded engagement of the two parts of the split shell is facilitated by the provision of the lugs 3, 3' adapted to be engaged by a spanner.

The manner of using the coupling will be apparent to those familiar with this art, in view of the above description, the ball member 13 being positioned uppermost and having its inlet opening 17 in communication with the source of supply for the gasoline which passes in a straight-line flow downwardly through the sealing ring 25 and guide tube 18, finally escaping outwardly through the discharge opening 9 from which it is conducted to the desired point by any suitable means such as a flexible hose or other equivalent conduit.

Any gasoline finding its way to the space surrounding the guide tube during flow thereof through the coupling subsequently drains downwardly through the apertures 24, drainage grooves 22, and the notches 23, escaping to the discharge outlet 9.

Although the guide tube 18 is removable when desired, it is maintained at all times firmly seated within its receiving recess 10 due to the action of the spring 21, the spring also functioning to constantly exert an upward pressure upon the sealing ring 25 whereby to maintain a sealed joint between the curved portion 26 and the internal surface of the ball member as well as maintaining the necessary pressure between the external surface of the ball member and the gasket 12 to assure a non-leakable joint at this point. It will be apparent from an inspection of Fig. 2 that the cooperation between the sealing ring 25, the ball member 13 and the part 1 of the shell, under the pressure exerted by the coiled compression spring 21, will maintain the necessary sealed joints at the desired points, while at the same time permitting the ball member 13 to be bodily moved within the shell upon the application of comparatively little force.

Should the several parts become corroded to an objectionable extent, or foreign matter become lodged within the interior of the coupling, it is obvious that all of the parts may be entirely disassembled for cleaning and again reassembled with very little expenditure of time or effort. This is considered an important feature from the commercial viewpoint.

As required by the patent statutes, the preferred embodiment of the invention has been illustrated and described. It is obvious, however, that many changes in details and in the arrangement of parts may be made without departing from the spirit of the invention. It is therefore not intended to limit the invention beyond that particularly defined by the appended claims.

I claim:

1. A flexible coupling comprising a split shell, a ball member having external and internal sealing surfaces swivelly mounted within said shell, a removable tubular guide rigidly mounted in said shell and projecting towards said ball member, a sealing ring slidably mounted on said tube and contacting the internal sealing surface of the ball member, and a coiled spring encircling said tube and having one of its ends bearing against the said sealing ring for resiliently urging it towards the ball member and for maintaining a sealing joint between the said external sealing surface of the ball member and the shell.

2. A flexible coupling comprising a split shell, a ball member having external and internal sealing surfaces swivelly mounted within one portion of said shell, the remaining portion of said shell being provided with a receiving recess, a tubular guide having one end seated in said recess and provided with an abutment intermediate its ends, a sealing ring contacting the internal sealing surface of the ball member, and a coiled compression spring encircling the guide tube interposed between said abutment and ring for urging the tube towards its receiving recess and the said ring towards the ball member, the exterior surface of the ball member coacting with the first named portion of the shell to form a sealed joint therebetween.

3. A flexible coupling comprising a split shell, a ball member having external and internal sealing surfaces swivelly mounted within one portion of said shell, the remaining portion of said shell being provided with a receiving recess, a tubular guide having an enlarged terminal seated in said recess, said enlarged terminal providing an annular abutment, a sealing ring contacting the internal sealing surface of the ball member telescopically riding upon the said tube, and a coiled compression spring having its opposite ends seated upon said abutment and ring, respectively, for maintaining the guide tube seated within its receiving recess and the sealing ring in engagement with the ball member, the exterior surface of the ball member coacting with said first named portion of the shell to form a sealed joint therebetween.

4. A flexible coupling comprising a split shell, a ball member having external and internal sealing surfaces swivelly mounted within one portion of said shell, the remaining portion of said shell being provided with a receiving recess, a tubular guide having an enlarged terminal seated in said recess, said enlarged terminal providing an annular abutment, the said receiving recess and the enlarged terminal of the guide tube cooperating to form drainage passages leading from the space surrounding the tube to the interior of the shell, a sealing ring contacting the internal sealing surface of the ball member telescopically riding upon the said tube, and a coiled compression spring having its opposite ends seated upon said abutment and ring, respectively, for maintaining the guide tube seated within its receiving recess and the sealing ring in engagement with the ball member, the exterior surface of the ball member coacting with said first named portion of the shell to form a sealed joint therebetween.

5. A flexible coupling comprising a two-part split shell, one part of the shell having an inlet opening and provided upon its inner surface with an annular groove, a sealing gasket seated in said groove and projecting radially inwards beyond the shell, a ball member swivelled in the shell and having its exterior semi-spherical surface coacting with said sealing gasket, the remaining part of the shell having a discharge opening surrounded by a receiving recess, a guide tube having an enlarged end seated in said recess and projecting towards the ball member, said tube being provided with drainage openings extending through the wall thereof at the point of juncture of said recess with the interior of the shell, the bore of said tube being disposed in alignment with the said inlet and discharge openings whereby to provide a straight-line flow through the coupling, an annulus contacting the inner wall of the ball member, and a coiled compression spring encircling the guide tube and supported upon the said enlarged end of the guide tube for urging the said annulus towards the ball member and maintaining the guide tube in its seat.

In testimony whereof, I sign my name.

JAMES H. LONSDALE.